| United States Patent [19] | [11] 3,955,997 |
|---|---|
| Sagane et al. | [45] May 11, 1976 |

[54] SEMI-SOLID EMULSION COATING COMPOSITION

[75] Inventors: Masahiko Sagane, Hiratsuka; Koichi Murai, Kyoto, both of Japan

[73] Assignee: Kansai Paint Company, Amagasaki, Japan

[22] Filed: Aug. 3, 1973

[21] Appl. No.: 385,422

[30] Foreign Application Priority Data
Aug. 9, 1972 Japan.............................. 47-79178

[52] U.S. Cl. ............................... 106/131; 106/171; 106/211; 106/189; 260/17 R; 260/18 R; 260/23 R; 260/29.6 BE; 260/29.6 E; 260/874
[51] Int. Cl.² ..................... C08L 23/04; C08L 91/00
[58] Field of Search ........... 106/191, 131, 171, 189, 106/29.7 E; 260/328 R, 618 R, 611 R, 29.6 BE, 29.6 E, 23, 1, 29.6 F, 17, 18 R; 252/316

[56] References Cited
UNITED STATES PATENTS

| 3,280,050 | 10/1966 | Johnson | 260/23 R |
|---|---|---|---|
| 3,438,903 | 4/1969 | Prahl | 252/478 |
| 3,630,896 | 12/1971 | Oka | 252/316 |
| 3,810,784 | 5/1974 | Wong et al. | 117/126 GE |

OTHER PUBLICATIONS

Chem. Abst. 64,8486 f 1966.

*Primary Examiner*—Theodore Morris
*Attorney, Agent, or Firm*—Wigman & Cohen

[57] ABSTRACT

A semi-solid emulsion coating composition which is shapable and fluidizable under shear when contacted to the surface of an article to be coated, and comprising at least an aqueous emulsion; a water-soluble organic solvent; a thixotropy imparting material selected from hydrogenated castor oil and condensation product of pentahydric to heptahydric sugar alcohols with aromatic aldehydes; and, if necessary, a hydrophilic polymer.

4 Claims, No Drawings

SEMI-SOLID EMULSION COATING COMPOSITION

This invention relates to a semi-solid emulsion coating composition which comprises a fluid emulsion coating material and a thixotropy imparting material.

In the conventional art, the fluidity of the ordinary emulsion coating material causes several disadvantages when it is practically applied to several articles. That is, the tools or devices such as brushes, roller brushes, spraying devices and the like are indispensable for applying the coating material; the re-dispersing of the coating material just before applying is often necessary as its dispersed components such as pigments and other ingredients are liable to separate and settle during the storage period; the adjustment of consistency by adding water is often required immediately before the use in some instance; the surroundings are subject to become dirty by dripping of the coating material; the loss of the coating material during the applying is considerably large; and it is necessary to wash up the applying device after the applying operation. Especially, when a small area is to be applied with the coating material, the above-mentioned disadvantages become comparatively significant, which is undesirable in the practical and economical viewpoints.

Where the surface of an article is to be simply colored, the coloring materials such as crayons, chalks, lipsticks and felt pens containing coloring agents may be employed without suffering the above-mentioned disadvantages. These coating materials are serviceable for certain limited purpose, however, the coloring effect, surface protecting property and durability of the colored layer are not satisfactory because there is no film forming property. Accordingly it will be apparent that they can not be employed as the coating materials in a conventional meaning.

Further, it is possible to give a semi-solid property to the coating material containing organic solvent as the liquid medium or dispersion medium by adding the thixotropy imparting material such as benzylidene sorbitol through dissolving or dispersing. However, when a surface is soiled unexpectedly or unnecessarily by such coating material during the applying, it must be removed by using an organic solvent, requiring special care when applying such coating material.

In view of the above, the principal object of the present invention is to eliminate the above-mentioned disadvantages.

Further object of the invention is to provide a novel and improved semi-solid emulsion coating composition which can be conveniently and readily used for the coating, even if it is a relatively small area, while the semi-solid emulsion coating composition forms a coating film having the same characteristics as those of the conventional emulsion coating materials in respect of the appearance and durability of the coated film.

Another object of the present invention is to provide a semi-solid emulsion coating composition which can be handled like a solid material and easily applied by hand without using any applying tool or device, where the composition being partly fluidized by the shearing force in the applying.

The term "semi-solid" as used herein means the condition which can be shaped into any configuration and handled like a solid in stationary or sub-stationary state at room temperature, but is given fluidity to a degree sufficient to be transferred to a surface of any hard shaped article by proper shearing force by hand of an ordinary man in the applying operation.

That is, the semi-solid emulsion coating composition which is shapable and fluidizable under shear according to the present invention comprises at least (1) an aqueous emulsion, (2) a water-soluble organic solvent, and (3) a thixotropy imparting material. The contents of the additives (2) and (3) for the aqueous emulsion (1) in the semi-solid composition are 35 to 65% by weight for the water-soluble organic solvent (2) and 1 to 5% by weight for the thixotropy imparting material (3) respectively based on the total weight. In some cases the solidification of the emulsion paint is improved by the addition of a hydrophilic polymer in an amount of 0.5 to 5% by weight based on the total weight. If desired, the semi-solid emulsion coating composition may further contain metallic soap and/or siliceous compound to improve further the applicability. In addition to the above, waxy compounds may also be incorporated in the semi-solid emulsion coating composition.

The aqueous emulsion used as the raw material for the preparation of the semi-solid emulsion coating of the present invention comprises aqueous emulsions having film forming component is dispersed form such as aqueous organic polymer emulsions or modified drying oil emulsions as generally used for the conventional emulsion paints as the film-forming components such as emulsions or latexes or polyvinyl esters such as polyvinyl acetate, vinyl acetate-ethylene copolymers, polyvinyl chloride, acrylic resins, polystyrene, styrenebutadiene copolymers, polyacrylonitrile, polyamides, vinyl chloride-vinylidene chloride copolymers and fluorinated copolymer resins. Further, the conventional emulsion paints themselves prepared by adding coloring pigments, extenders, plasticizers, anti-molding reagents and the other supplemental ingredients may also be used. The content of the film forming component in the aqueous emulsion as used for the semi-solid emulsion coating composition of the present invention may be, though it varies according to the amount of the other ingredients and uses of the composition prepared, preferably 20 to 60% by weight. In cases where the content of the film forming component is less than 20% by weight, the film-forming property is deteriorated, while the miscibility with the other ingredients is reduced when the content exceeds 60% by weight, therefore the aqueous emulsions out of the above range is not prefered.

The above-mentioned water soluble organic solvent used in the present invention is added so as to improve the miscibility of the aqueous emulsion with the thixotropy imparting material, therefore it must be compatible with both water and the thixotropy imparting material and have no ill effect to the film forming ability of the aqueous emulsion. More particularly, as the water soluble organic solvents, there are methyl alcohol, ethyl alcohol, n-propyl alcohol, isopropyl alcohol, tert-butyl alcohol, ethyleneglycol, propyleneglycol, dioxane, tetrahydrofuran, ethyleneglycol monomethyl ether (methyl cellosolve), ethyleneglycol monoethyl ether, ethyleneglycol mono-n-butyl ether, diethyleneglycol monobutyl ether (butyl carbitol), diacetone alcohol, N,N-dimethyl formamide, N-N-dimethyl acetamide, N-methyl-2-pyrrolidone, dimethyl acetal, dimethyl sulfoxide, ethylene carbonate, acetone, methyl formate and the like. Among these water-soluble organic solvents, those which have an unlimited or substantially unlimited solubility at room temperature may be used solely but those which have a limited solubility such as, for example, 50 g or less in 100 g of water at room temperature such as methyl formate or ethylene carbonate are preferably used along with the highly water-soluble organic solvent. These solvents can be used solely or in a mixture of two or more. The amount of use of water soluble organic solvents is 35 to 65% by weight, preferably 45 to 60% by weight, against the total of the semi-solid emulsion coating emulsion coating composition. In case the solvent is less than 35% by weight, an even dispersion of the thixotropy imparting material may be hardly obtained so that it is difficult to prepare the semi-solid emulsion coating composition which forms smooth coating film. On the contrary, in case the organic solvent is more than 65% by weight, the content of the film forming ingredients in the composition must become less, so that the thickness of the film formed by each applying becomes very small, and a multiple applying of the composition is required in order to form a thick coating film.

In the present invention, the semi-solidifying of the aqueous emulsion is mainly effected by the thixotropy imparting material, and the thixotropy imparting material used for the composition of the present invention is selected from hydrogenated castor oil and condensation products (hereinafter referred to as "benzylidene sorbitols") of pentahydric to heptahydric sugar alcohols with aromatic aldehydes. By using these materials as the thixotropy imparting material of the invention, a semi-solid emulsion coating composition having excellent properties can be prepared.

The benzylidene sorbitols may be prepared by condensing aromatic aldehydes such as benzaldehyde, ortho-, para- and meta- tolualdehydes, anisaldehyde and amino-, nitro- and halogeno-benzaldehydes with whole or a portion of the hydroxy groups of pentahydric to heptahydric sugar alcohols such as xylitol, sorbitol α-gluco heptitol and their homologues in various isomeric forms. Either of the benzylidene sorbitols or hydrogenated castor oil, or if necessary, both of them can be used as the thixotropy imparting material.

As the aromatic aldehydes to be condensed with the sugar alcohols there may be used, for example, benzaldehyde, ortho-, para-, and meta- tolualdehyde, anisaldehyde and substituted benzaldehydes having from 1 to 3 amino groups, nitro groups or halogen atoms in their benzene nucleus. One mole of the sugar alcohols should be combined with at least 1 mole of the aromatic aldehyde as calculated from the "acetal value" in order to obtain a sufficient semi-solidifying effect. Preferably almost a saturation amount of aromatic aldehyde as can be combined in acetal form to the sugar alcohol should be condensed, for example 2 or near 2 moles of aromatic aldehyde when the sugar alcohol is a heptitol, and 3 or almost 3 moles of aromatic aldehyde when the sugar alcohol is a hexitol or a heptitol per 1 mole of the sugar alcohol should be condensed. The content of these thixotropy imparting materials is in the range of 1 to 5% by weight, preferably 2 to 4% by weight, to the total amount of semi-solid emulsion coating composition. In case the content of the thixotropy imparting material is less than 1% by weight, sufficient semi-solidifying can not be obtained, so that the formation of uniform coating film can not be attained by the undesirable deformation of the shaped composition. While, in case it is more than 5% by weight, the semi-solidifying is proceeded excessively, so that the applying of the coating composition becomes difficult.

As disclosed in the above, the semi-solid emulsion coating composition of the present invention is prepared by adding water soluble organic solvent and the thixotropy imparting material. However, as discribed before in order to improve the solidification and the leveling properties of the coating film and to prevent the checking and peeling during the applying, it is necessary to incorporate further an hydrophilic polymer as an auxiliary additive for solidifying.

As the hydrophilic polymer used for this purpose, there are, for example, hydrophilic cellulose derivative such as methyl cellulose, ethyl cellulose, hydroxyethyl cellulose, hydroxypropyl cellulose and sodium carboxymethyl cellulose, polyvinyl alcohol, poly-N-vinyl pyrrolidone, polyacrylate and its alkali or ammonium salts, polyethyleneglycol, polypropyleneglycol, starch, gelatine, casein, acaciagum (gum arabic), tragacanth gum and sodium alginate. The compounding ratio of these hydrophilic polymers is 0.5 to 5% by weight, preferably 1 to 4% by weight, to the total weight of the semi-solid emulsion coating composition. Meanwhile, in case any of the above hydrophilic polymer is contained in the aqueous emulsion, the sum of the hydrophilic polymers must be made within the above-mentioned range.

In the semi-solid emulsion coating composition, if the amount of the hydrophilic polymer is less than 0.5% by weight, the elimination of defect to form cracking can not be expected. While, if the compounding ratio of hydrophilic polymer exceeds 5% by weight, the stickiness of the composition becomes excessively large, so that the workability for applying is reduced.

Further, in order to control and improve the shapability, slidability and touch of the composition in applying, metallic soaps and siliceous compounds may be further incorporated in the semi-solid emulsion coating composition of the present invention. Additionally, waxy compound such as parafine wax, spermaceti, bees' wax and the like having a melting point of below 100°C may be incorporated in the semi-solid emulsion coating composition to improve the hardness of the composition or the water resistance of the coated film. The amounts of these thixotropy accomodator, namely metallic soaps, siliceous compound and waxy compound, should not exceed 20% by weight to the total of the composition as the sum of them. Still more, similarly to the conventional liquid aqueous emulsion coating materials, any of pigments extender, plasticizers, anti-molding reagents and any other supplemental ingredient may also be contained in the semi-solid emulsion coating composition of the present invention.

The degree of solidification of the semi-solid emulsion coating composition when measured as hereinafter described, has a value within the range of 500 to 6000 g/cm$^2$. This method is such that, in the first place, a glass made column of 3 mm in diameter is fixed positioned in the vertical direction, then the horizontal upper surface of a semi-solid emulsion coating composition regulated at 25° C is contacted without contact pressure to the horizontal bottom surface of the glass column. Thereafter, the semi-solid emulsion coating composition is lifted while maintaining the same temperature by a vertical upward force while continuously increasing its power at a constant rate of 10 g/sec. Thereby, the glass column is depressed into the semi-solid emulsion coating composition, and the loads when the depression of column reaches to some depths are measured. Further, the relation between the depths of depressions and respective values of loads is graphically drawn, and the load corresponding to the depth of the depression zero is read from thus obtained diagram by the extrapolation method. The value of the load thus obtained is converted into and expressed by a load per square centimeter, which is used as the measure for the degree of solidifying and hereinafter referred to as "hardness". When the hardness is less than 500 g/cm$^2$, the composition is too soft to be handled in applying, and when the hardness is more than 6,000 g/cm$^2$, the composition becomes too hard so that the composition can hardly be transfered to the surface of an article.

In the preparation of the semi-solid emulsion coating composition of the present invention, it is not necessary to follow any special process of preparation, and the most suitable preparation process may be employed depending on the kinds and amounts of the components to be used. For example, the hydrophilic polymer is added to the aqueous emulsion, while the thixotropy inparting material is dissolved in the water soluble organic solvent, and the thus obtained intermediates are mixed together. Or, where the hydrophilic polymer is soluble in the water soluble organic solvent, it may be added to the solvent together with the thixotropy imparting material. The thus obtained intermediate mixture is added to the aqueous emulsion. It is generally desirable that the thixotropy imparting material is added to the aqueous emulsion in a warmed condition. When a colored semi-solid emulsion coating composition is to be prepared, the thixotropy imparting material is added to a colored aqueous emulsion coating composition in liquid state, or the coloring pigment may be added to the aqueous emulsion containing the thixotropy imparting material when it is hot and in liquid state. The above-mentioned mixing steps of each ingredient can be carried out by several dispersing apparatus such as ball mills, colloid mills and mixing propellers.

The aqueous emulsion containing the thixotropy imparting material and other compounding materials may be cooled to form a semi-solid body, which can be used in block forms or cut pieces. Also the present composition may be filled before cooling in a small cavity of a sliding holder for applying and then changed into semi-solid body in the cavity in course of time.

It has been well known in the ordinary art that the conventional liquid coating materials may be improved by adding a small amount of thixotropy imparting material in relation to the applicability. However, the object of the present invention is quite different from the above conventional technique, that is, in the present invention, the thixotropy of the fluid coating material is greatly fortified by adding a certain amount of the thixotropy imparting material such as benzylidene sorbitol homologues. In this manner the product can be shaped in any form and size according to the requirement of use. Further, though the product appears like a solid in a stationary condition, it is readily rendered fluid by shearing when applied against a surface of an article to be coated through its thixotropic character, and the fluidized coating composition is thus transferred to the surface. Of course, it is also known that certain kinds of liquid may be solidified by the addition of small amount of thixotropy imparting materials, however, the substantial purpose of the solidifying in such cases is merely to obtain a solid. Contrary to the above, the semi-solid in the meaning of the present invention is shapable by cutting or molding, and nevertheless it can be easily fluidized by shear to the extent that can be transferred to a surface of an article. This fact has never been anticipated directly from the above-mentioned conventional technique.

The semi-solid emulsion coating composition of the present invention can be applied with almost the same easiness as compared with the brushing, roller brushing and the like for the conventional fluid coating materials, and the composition of the present invention is very advantageous in that no tool or device for application is required. Therefore, it is especially advantageous when a small area is to be coated as well as in the coating of a large area. In addition to the above feature of the present invention, the semi-solid emulsion coating composition forms a continuous coating film having the same protective and decorative effects as those of the conventional fluid ones.

In order that those skilled in the art may better understand the present invention and the manner in which it may be practised, the following specific examples are given.

EXAMPLE 1

Into a 500 ml three neck flask which being provided with a reflux condenser and a stirrer, 120 g of ethyl alcohol and 3 g of hydroxypropyl cellulose were fed then the latter was dissolved by heating under reflux. Then 74 g of a polyvinyl acetate white emulsion paint of polyvinyl acetate (trade name:"Vinypaint No. 200 White" made by Kansai Paint Co., Ltd., Japan) was added to the above obtained solution thereafter 3 g of benzylidene sorbitol which had been prepared according to the following process was further added, and stirring was continued for 30 minutes at about 70°C to effect an uniform dispersion. After that, the dispersion was allowed to cool to room temperature, thus a white semi-solid emulsion coating composition of the present invention was obtained. The hardness of this composition was 970 g/cm$^2$.

A stick of the semi-solid emulsion coating composition was then formed from the above composition, and it was applied on a surface of wooden article by hand, where the composition could be applied smoothly on that surface.

Preparation of Benzylidene Sorbitol:

To a mixture of 40.0 g of 70% sorbitol, 29.4 g of benzaldehyde and 520 ml of cyclohexane under nitrogen gas was added 0.3 ml of 96% sulfuric acid dropwise with stirring, then the mixture was heated to allow to condense while eliminating the generated water by azeotropic distillation. After about 7 hours' continuation of the reaction, the reaction mixture was cooled to room temperature and then neutralized. The precipitate was settled and washed with water by decantation, then filtered and rinsed several times with hot water, further finally dried to obtain the reaction product as white powder.

The acetal value of the product was 296.4 which corresponds to a combination ratio of 1.8 moles of benzaldehyde per 1 mole of sorbitol.

EXAMPLE 2

Using the same apparatus as in Example 1, a homogeneous solution consisting of 50 g of propyleneglycol and 2 g ethyl cellulose was prepared by heating them together at about 70°C in the flask. Then, 80 g of a white acrylic resin emulsion paint (trade name: "Viny-Deluxe No. 200 White" made by Kansai Paint Co., Ltd., Japan) was added to the above obtained solution, and they were mixed well at about 70°C to form a uniform mixture. While, 8 g of methyl benzylidene sorbitol as prepared through the following process was added to 60 g of propyleneglycol to form a solution and this solution was gradually poured to the above mixture which being kept at about 70°C. Further, after maintaining the mixture at the same temperature for about 30 minutes, it was allowed to cool, thus a white semi-solid emulsion coating composition of 3,150 g/cm$^2$ in hardness was obtained.

The semi-solid emulsion coating composition thus obtained could be easily applied to the smooth surface of a wooden board.

Preparation of Methyl Benzylidene Sorbitol

The methyl benzylidene sorbitol was prepared in like manner as the benzylidene sorbitol in the foregoing Example 1. in which 32.0 g of 70% sorbitol, 44.3 g of para-tolualdehyde and 580 ml of cyclohexane were used. The acetal value of the reaction product in white powder from was about 345 which corresponds to the combination ratio of 3.0 moles of paratolualdehyde per 1 mole of sorbitol.

EXAMPLE 3

Six grams of water soluble polyvinyl alcohol having a number average molecular weight of 500 was added to 80 g of the acrylic resin white emulsion paint as used in Example 2, and the mixture was heated to about 80°C to dissolve the polyvinyl alcohol. Then, each 54 g of ethyl alcohol and propylene glycol were added to the above mixture, and further 6 g of benzylidene sorbitol as used in Example 1 was added and stirred at the same temperature for 30 minutes, thereby the mixture was made uniform. After cooling to room temperature, a white semi-solid emulsion coating composition of 4,200 g/cm$^2$ in hardness was obtained.

EXAMPLE 4

Four grams of polyethylene glycol having a number average molecular weight of 100 was added and dissolved into 111 g of an acrylic resin red emulsion paint (trade name: "Viny-Deluxe No. 200 Red" made by Kansai Paint Co., Ltd., Japan), and 20 g of N,N-dimethyl formamide and 56 g of isopropyl alcohol were further added to the emulsion paint, the mixture was then heated to about 70°C. Thereafter 8 g of hydrogenated castor oil (trade name: "Thixatrol ST" made by The Baker Castor Oil Co., Ltd., U.S.A.) was dispersed into the above obtained mixture, thereby a red semi-solid emulsion coating composition of 510 g/cm$^2$ in hardness was obtained.

This semi-solid emulsion coating composition could be also easily applied to the planed surface of a wooden board.

EXAMPLE 5

To 500 g of a copolymer emulsion of vinyl acetate and dibutyl maleate (trade name: "Movinyl DMIH" made by Hoechst Synthetics Co., Ltd., Japan) were added 150 g of propylene glycol, 0.2 of 2-(4-thiazolyl)-benzimidazole (anti-molding reagent), 80 g of anatase-type titanium dioxide and 25 g of polyvinyl alcohol having a number average molecular weight of 1,500, and they were dispersed in a ball mill for about 20 hours. To 121 g of the dispersion obtained above were added 22 g of dioxane, 22 g of isopropyl alcohol, 2 g of benzylidene sorbitol as used in Example 1 and 6 g of the afore-mentioned Thixatrol ST (trade name) used in foregoing Example 4, and they were well mixed while heating at about 80°C. As the result, a white semi-solid emulsion coating composition of 650 g/cm$^2$ in hardness was obtained.

The semi-solid emulsion coating composition thus prepared could be easily applied to the smoothly planed surface of a wooden board.

EXAMPLE 6

To 150 g of polyvinyl chloride emulsion (trade name: "Movinyl No. 100" made by Hoechst Synthetics Co., Ltd., Japan) were added 30 g of organic modified bentonite (trade name: "Orben No. 2" made by Shiraishi Calcium Industries Co., Ltd., Japan) 10 g of di-n-octyl phthalate, and 8 g of methyl cellulose and dispersed or dissolved. Then, 40 g of ethyl cellosolve and 150 g of ethyl alcohol were further added to the emulsion and the mixture was heated to about 80°C, to which 12 g of methyl benzylidene sorbitol as used in Example 2 was dispersed.

The hardness of thus obtained semi-solid emulsion coating composition was 730 g/cm$^2$, and when it was applied to the wooden surface, excellent effect as a wood filler could be obtained.

EXAMPLE 7

To 196 g of acrylonitrile-n-butyl acrylate copolymer emulsion (trade name: "Vinysol SC No. 115" made by Daido Chemical Industries Co., Ltd., Japan) was added 16 g of polyvinyl pyrrolidone to dissolve, then 140 g of ethyl alcohol, 20 g of acetone and 20 g of carbitol acetate were mixed further. The above mixture was thereafter heated to 80°C and 8 g of benzylidene α-gluco heptitol as prepared through the following process was added, and it was kept at the same temperature with stirring for 30 minutes. Then, the mixture was allowed to cool to obtain semi-solid emulsion coating composition.

The hardness of the semi-solid coating composition thus obtained was 890 g/cm$^2$, and the composition was suitable for the purpose of anti-rusting for steel in temporal use.

Preparation of Benzylidene α-Glucoheptitol:

According to almost the same process for preparing benzylidene sorbitol in Example 1, the condensation was carried out by using 38.0 g of α-glucoheptitol, 38.0 g of benzaldehyde and 550 ml of cyclohexane. The resultant product was white powder, and the acetal value of which was 288 which corresponds to a combination ratio of 2 moles of benzaldehyde per 1 mole of α-glucoheptitol.

EXAMPLE 8

Using 74 g of polyvinyl acetate green emulsion paint (trade name: "Vinypaint Green" made by Kansai Paint Co., Ltd., Japan), 56 g of ethyl alcohol, 56 g of propylene glycol, 6 g water-soluble polyvinyl alcohol having a number average molecular weight of 1500 and 8 g of benzylidene sorbitol as used in Example 1, the same process as in Example 1 was carried out, thereby a green semi-solid emulsion coating composition of 5,300 g/cm$^2$ in hardness was obtained.

The semi-solid emulsion coating composition thus obtained could be easily applied to the surfaces of wooden boards and mild steel plates.

EXAMPLE 9

Into a 500 ml three neck flask as used in Example 1,50 g of a polyvinyl acetate red emulsion paint (trade name: "Vinypaint V 20 red" made by Kansai Paint Co., Ltd., Japan), 50 g of ethyl alcohol and 1.8 g of benzylidene sorbitol as used in Example 1 were charged and heated to the reflux temperature for about 1 hour to dissolve the benzylidene sorbitol, then 10 g of spermaceti (trade name: "Diamond Wax", made by New-Japan Chemical Co., Ltd., Japan) and 2 g of siliceous compound (trade name: "Aerosil No. 380", made by Nippon Aerosil Co., Ltd., Japan) were added to the above emulsion paint in hot state and mixed well.

On the one hand 3.0 g of benzylidene sorbitol was dissolved in 20 g of ethyleneglycol monoethyl ether (cellosolve) by heating at 130°C and the hot solution was poured into the above treated emulsion paint with stirring.

The mixture was allowed to cool to room temperature and formed a red semi-solid emulsion paint composition having a hardness of 5300 g/cm$^2$ which can be easily applied on the surface of a wooden board to effect a smooth coating with an excellent appearance.

According to the above examples, it will be understood that the shapable and fluidizable semi-solid emulsion coating composition of the present invention can be advantageously put to the practical uses without any troublesome coating operation and coating facilities. It should be emphasized however, that the specific example as shown herein are intended as merely illustrative and in no way restrictive of the invention.

What is claimed is:

1. A semi-solid emulsion coating composition which is shapable and fluidizable under shear, comprising:
    A. an aqueous emulsion comprising a film-forming polymeric component selected from the group consisting of modified drying oil, polyvinyl esters, comprising polyvinyl acetate, vinyl acetate-ethylene copolymer, polyvinyl chloride, acrylic resin, polystyrene, styrene-butadiene copolymer, polyacrylonitrile, polyamide, vinyl chloride-vinylidene chloride copolymer and fluorinated copolymer resin;
    B. a water soluble organic solvent selected from the group consisting of methyl alcohol, ethyl alcohol, n-propyl alcohol, isopropyl alcohol, tert-butyl alcohol, ethyleneglycol, propyleneglycol, dioxane, tetrahydrofuran, ethyleneglycol, monomethyl ether, ethyleneglycol monoethyl ether, ethyleneglycol mono-n-butyl ether, diethyleneglycol monobutyl ether, diacetone alcohol N,N-dimethyl formamide, N,N-dimethyl acetamide, N-methyl-1-pyrrolidone, dimethyl acetal, dimethyl sulfoxide, ethylene carbonate, acetone, methyl formate;
    C. a thixotropy imparting material selected from a group consisting of hydrogenated caster oil and condensation products of pentahydric to heptahydric sugar alcohols with aromatic aldehydes; and
    D. a hydrophilic polymer selected from the group consisting of hydrophilic cellulose derivative such as methyl cellulose, ethyl cellulose, hydroxyethyl cellulose, hydroxypropyl cellulose and sodium carboxymethyl cellulose, polyvinyl alcohol, poly-N-vinyl pyrrolidone,, polyacrylate and its alkali or ammonium salts, polyethyleneglycol, polypropyleneglycol, starch, gelatine, casein, acasia-gum (gum arabic), tragacanth gum and sodium alginate;
    said coating composition comprising from about 35 to about 65% by weight water soluble organic solvent, from about 1 to about 5% by weight thixotropic imparting material, from 0.5 to 5% by weight hydrophilic polymer, and from about 20 to about 60 % by weight polymeric material; said coating composition characterized as having a defined hardness ranging from 500 to 6,000 g/cm$^2$.

2. A semi-solid emulsion coating composition as claimed in claim 1, in which said aromatic aldehyde is at least a member selected from the group consisting of benzaldehyde, ortho-, para- and meta-tolualdehydes, anisaldehyde, and amino-, nitro and halogeno-benzaldehydes.

3. A semi-solid emulsion coating composition as claimed in claim 1, in which any of pigments, fillers, plasticizers, mold inhibitors are added to said composition.

4. A semi-solid emulsion coating composition as claimed in claim 1, which further comprises metallic soap, siliceous compound comprising bentonite and/or fine powdered silica, and/or waxy compound comprising paraffin wax, spermaceti and bees' wax in an amount such that the sum thereof does not exceed 20% by weight based on the total amount of said semi-solid emulsion coating composition.

* * * * *

UNITED STATES PATENT AND TRADEMARK OFFICE
CERTIFICATE OF CORRECTION

PATENT NO. : 3,955,997
DATED : May 11, 1976
INVENTOR(S) : Masahiko Sagane and Koichi Murai It is certified that error appears in the above–identified patent and that said Letters Patent are hereby corrected as shown below:

[73] Assignee: after "Kansai Paint Company, Amagasaki, Japan" please insert --New Japan Chemical Co., Ltd., Kyoto-fu, Japan--.

Signed and Sealed this

Eighteenth Day of January 1977

[SEAL]

Attest:

RUTH C. MASON
Attesting Officer

C. MARSHALL DANN
Commissioner of Patents and Trademarks